United States Patent [19]

Rowatt

[11] 4,220,580

[45] Sep. 2, 1980

[54] BINGHAM FLUID COMPOSITIONS

[75] Inventor: Robert J. Rowatt, Orange, Tex.

[73] Assignee: Gulf Oil Corporation, Pittsburgh, Pa.

[21] Appl. No.: 927,229

[22] Filed: Jul. 24, 1978

[51] Int. Cl.$^2$ .............................................. C08F 4/58
[52] U.S. Cl. ............................ 260/33.6 PQ; 526/129; 526/130; 526/194
[58] Field of Search ................ 260/33.6 PQ; 526/129, 526/130, 194, 201

[56] References Cited

U.S. PATENT DOCUMENTS

| 3,492,231 | 1/1970 | McMillen | 260/33.6 PQ |
| 4,046,945 | 9/1977 | Baxmann | 260/33.6 PQ |

Primary Examiner—Paul R. Michl
Attorney, Agent, or Firm—Richard L. Kelly

[57] ABSTRACT

Bingham fluid compositions are provided which contain a functional material such as a polymerization initiator dispersed in a continuous solid phase, which is a mixture of liquid hydrocarbon, a finely-divided olefin polymer, and a small quantity of a siliceous material having a number of hydroxyl groups chemically bonded to silicon atoms. These compositions, while solid at ambient temperature and pressure, assume the flow characteristics of a liquid under a shearing stress and can be pumped to feed the functional material to a polymerization reactor or molten polymer on a continuous basis.

21 Claims, 1 Drawing Figure

BINGHAM FLUID COMPOSITIONS

BACKGROUND OF THE INVENTION

In many types of chemical and polymer processes, it is necessary to feed small quantities of a functional material to a reaction zone or to a molten polymer stream. Frequently considerable difficulties are encountered in introducing such functional materials at a continuous, uniform rate. These problems are especially difficult when it is necessary to feed finely-divided solid materials to a liquid or vapor medium, or where it is necessary to feed a material to a highly viscous liquid system such as a stream of molten polymer.

An example of a system in which a solid material must be added to a liquid reaction system sealed from the atmosphere is the introduction of finely-divided solid catalysts into olefin polymerizations that are carried out in a liquid hydrocarbon medium. A common method for introducing such catalyst solids to the liquid polymerization medium is to suspend the catalyst solids in a hydrocarbon medium, feed such a suspension to a cup maintained in a rotatable valve, and then to rotate the valve to dump the catalyst solids into the reaction medium. A typical catalyst feeding system of this type is shown in U.S. Pat. No. 3,257,363. By feeding the catalyst solids to the reaction medium in this manner, the catalyst is added to the reaction medium in finite charges on a discontinuous basis. As a consequence, in most instances, the concentration of catalyst particles varies in different sections of the polymerization medium.

In view of problems of the above types, it would be desirable to have available to the art improved compositions and methods for feeding functional materials to reaction systems on a truly continuous and uniform basis.

SUMMARY OF THE INVENTION

The applicants have discovered certain Bingham fluids* containing dispersions of at least one functional material such as a polymerization catalyst uniformly dispersed throughout a continuous solid phase. These Bingham fluids flow readily under an applied pressure and can be employed to introduce the functional material into a reaction system at a continuous uniform rate. The continuous solid phase of the Bingham fluid consists essentially of an intimate mixture of a liquid hydrocarbon, a finely-divided olefin polymer, and a small quantity of a siliceous material having a number of hydroxyl groups chemically bonded to silicon atoms.

*A Bingham fluid, sometimes referred to as a Bingham body, is a material which is a solid at a particular temperature under consideration, usually ambient temperature, but which will flow when subjected to an applied shearing stress which exceeds a minimum value characteristic of the system under consideration. For a description of the characteristics of Bingham fluids, see RHEOLOGY by Frederick Eirich, Academic Press Inc., New York City, Library of Congress Catalog Card 56-11131, particularly Volume 3, pages 198-201.

In one preferred embodiment of the invention, the functional material is a polymerization catalyst and the compositions are designed to introduce the catalyst into a mono-1-olefin polymerization reaction zone at a uniform rate. In a second preferred embodiment of the invention, the functional material is a polymer additive such as a colorant, an antiblock agent, an antioxidant, or the like, and the compositions are designed to introduce such additive(s) into a molten polymer at a uniform rate.

BRIEF DESCRIPTION OF THE DRAWING

The single drawing is a schematic representation of apparatus which can be employed to prepare the Bingham fluid compositions of the invention.

DETAILED DESCRIPTION OF THE INVENTION

Figure 1:
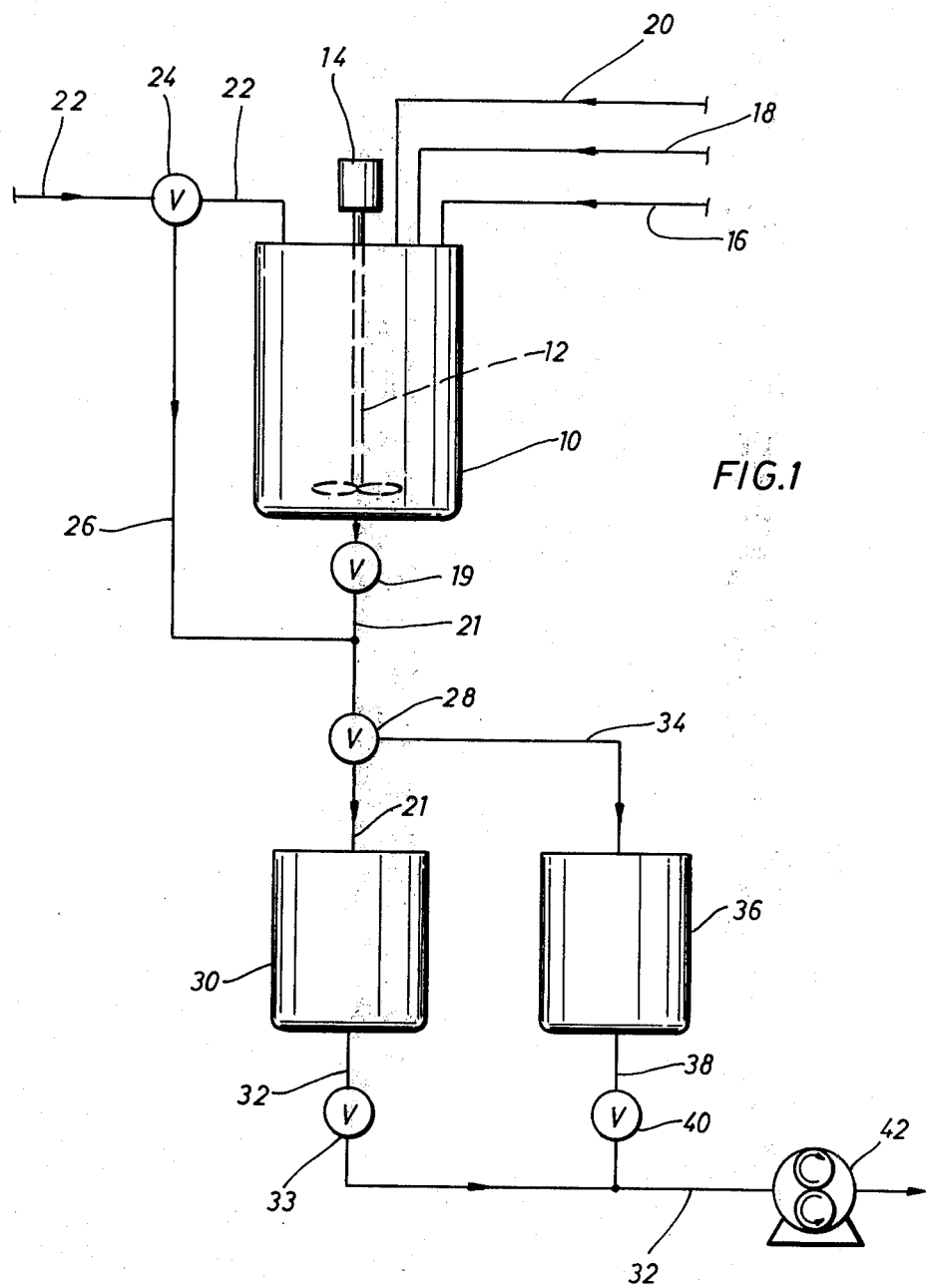

The continuous solid phase* of the Bingham fluid compositions of the invention consists of an intimate mixture of 100 parts by weight of a liquid hydrocarbon, about 2-250 parts, preferably about 10-200 parts, and especially about 50-150 parts by weight of a finely-divided olefin polymer, and at least about 0.2 parts and preferably about 0.5 to about 5 parts by weight of the siliceous material having a number of hydroxyl groups chemically bonded to silicon atoms.

*The continuous solid phase customarily serves merely as a carrier for the functional material.

The continuous solid phase of the Bingham fluid compositions of the invention, in most instances, is not a true solid in a classical chemical and physical sense. Rather, it is a network of extremely finely-divided solid particles dispersed throughout the liquid hydrocarbon. In many instances, the particles may be bonded to each other in a semi-crystalline lattice. In certain physical characteristics, the continuous solid phase resembles a gel. Regardless of its precise chemical and/or physical state, for the purpose of describing and claiming the invention, the wax-liquid hydrocarbon mixtures will be characterized simply as a "continuous solid phase."

The liquid hydrocarbon included in the continuous solid phase of the Bingham fluid compositions of the invention can be any of the common hydrocarbons of either the aliphatic or aromatic type. Generally, it is preferred to employ relatively low boiling aliphatic hydrocarbons, particularly the pentanes, hexanes, heptanes, and octanes. The preference for relatively low boiling hydrocarbons is based upon the ease by which they can be removed from the polymer system to which the Bingham fluid compositions are added. This phenomenon is subsequently described. It is recognized that it sometimes is desirable to incorporate relatively high boiling liquid hydrocarbons and/or hydrocarbon waxes into certain polymers such as high density ethylene polymers to serve as a cling additive or to modify the polymer's rheological properties. Where such hydrocarbons are desired in the final polymer composition, higher molecular weight hydrocarbons containing up to about 40 carbon atoms, including wax-like solids, can be employed as the hydrocarbon component of the Bingham fluid compositions. Where the hydrocarbon is a wax-like solid at ambient temperature, the Bingham fluid compositions should be stored and pumped at temperatures at least slightly above the hydrocarbon's melting point.

The continuous solid phases of the Bingham fluid compositions described above, by reason of being based on a hydrocarbon that is a liquid or a low melting solid at ambient temperature, are solids at ambient temperature and atmospheric pressure. If the Bingham fluids are to be employed at subambient temperatures and/or stored at pressures above atmospheric, it is possible to employ in the continuous solid phase lower boiling hydrocarbons such as butane, butene-1, propane, propylene, or ethylene. These lower boiling hydrocarbons, for the limited purpose of the present invention, are considered to be liquid hydrocarbons.

It will be recognized, of course, that such systems must be maintained at temperatures and pressures below the critical point of the liquid hydrocarbon included in the Bingham fluid composition. The critical point for ethylene is 9.9° C. and 50.5 atmospheres. The use of ethylene as the liquid hydrocarbon is desirable where the Bingham fluid compositions are introduced into an ethylene polymerization reactor and it is desired to hold the introduction of extraneous compounds into the polymerization zone to an absolute minimum.

To prepare Bingham fluid compositions for addition to propylene polymerization systems, propylene desirably may be employed as the liquid hydrocarbon component. The critical point for propylene is 91.9° C. and 45.4 atmospheres. Thus such Bingham fluid compositions can be stored at ambient temperature, but must be stored under a propylene pressure sufficiently high to maintain the propylene in the liquid state at the prevailing temperature.

The olefin polymer included in the continuous solid phase of the Bingham fluid composition should be finely divided. The majority of the polymer particles should pass through a 100 mesh screen (U.S. Standard). In general, the particle size should be as small as can be obtained on a practical basis. Ethylene and propylene polymers prepared by a particle form polymerization process are well suited for use in the invention. Such polymers typically have a bulk density of less than about 35 lbs/ft$^3$.

The olefin polymer employed may be of any type that is insoluble, at ambient temperature, in the liquid hydrocarbon employed in the Bingham fluid composition. Ethylene and propylene polymers are preferred. The olefin polymer employed in the Bingham fluid composition preferably should closely approximate the chemical type and properties of the polymer present in the system into which the Bingham fluid composition will be incorporated.

The siliceous materials included in the continuous solid phase of the Bingham fluid compositions are characterized by two parameters. First, the siliceous material has an average particle size such that at least one dimension is less than about 0.01 micron. Second, the siliceous material will have a number of hydroxyl groups chemically bonded to silicon atoms and can be considered to be a polymeric material containing the grouping

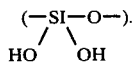

A representation of such a proposed structure is set forth in certain technical brochures published by the Cabot Corporation, e.g., the brochure entitled "Cab-O-Sil in adhesives." These materials have an oxygen/silicon atomic ratio of at least about 2.1/1.0 and preferably at least about 2.6/1.0.

The preferred siliceous materials are synthetic materials generically characterized as "fumed silicas." These materials are prepared by burning an organosilicon compound or silicon tetrachloride under conditions reported in printed publications. Typical specifications for a commercial product sold under the name Cab-O-Sil PTG are:

| | |
|---|---|
| Surface area (m$^2$/g) | 200±20 |
| pH (4% aqueous dispersion) | 3.8–4.1 |
| Density (lbs./cu. ft.) (as bagged) | 2.3 max. |
| 325-mesh Residue, % | 0.02 max. |
| Ignition Loss, % (1000° C. moisture-free basis) | 1 |
| Silica content, % | 99.8 min. |
| Specific gravity | 2.2 |
| Bulking value (gal. per 100 lbs.) | 5.5 |
| Refractive index | 1.46 |
| Color | White |
| X-ray form | Amorphous | some natural occurring siliceous materials such as certain grades of diatomaceous earth function similarly. Siliceous materials consisting essentially of SiO$_2$ cannot be employed as a component of the continuous solid phase of the Bingham fluid compositions.

The type of functional material included in the Bingham fluid compositions of the invention will depend upon the ultimate purpose for which the compositions are to be used. As earlier noted, one important use of the compositions of the invention is to feed a relatively low concentration of a functional material to an olefin polymerization reaction system at a uniform rate. In such compositions, the functional material can be one which will initiate the polymerization of the monomer(s) in the reaction zone, or which will control one or more polymer properties, such as molecular weight, by functioning as a telogenating agent, or which will modify one or more polymer properties by functioning as a comonomer or the like.

As earlier noted, a second important use of the compositions of the invention is to feed functional additives into molten polymer streams at a uniform rate (and frequently at relatively low concentrations) to prepare polymer compositions having such additives uniformly dispersed throughout the polymer. Typical additives of this type included colorants, antiblock agents, slip agents, antistatic agents, cling agents, and other additives customarily used in polymers and reported in the literature.

The compositions of the invention are particularly useful in introducing solid functional materials into systems of the type previously described. Where solid materials are to be employed as the functional material, they should have a relatively small particle size, with the majority of the particles being a size such that at least 50% of the solids will pass through a 50 mesh screen (U.S. Standard).

One desirable class of functional materials which can be dispersed in the Bingham fluid compositions of the invention are finely-divided inorganic materials which catalyze the stereospecific polymerization of olefins such as ethylene, propylene, higher monoolefins such as hexene, styrene, conjugated diolefins such as butadiene, isoprene, and the like. One example of such inorganic polymerization catalysts consists of a chromium catalyst supported upon a silica or a silica-alumina support. The chromium catalyst may be present as chromia, or certain organochromium compounds such as dicylopentadienyl chromium (II), and other similar organochromium compounds of the type disclosed in the following-issued U.S. patents:

| | | |
|---|---|---|
| 3,157,712 | 3,687,920 | 3,756,998 |
| 3,324,095 | 3,709,853 | 3,757,002 |

| -continued | | |
|---|---|---|
| 3,324,101 | 3,709,954 | 3,806,500 |

A second example of such inorganic polymerization catalysts consists of a molybdenum oxide catalyst carried upon an alumina support. A third example of such inorganic polymerization catalysts consists of the so-called Zeigler-type catalysts which are the reaction product of a salt of a transition metal of Group IV-B, V-B, or VI-B of the Periodic Table; and an organometallic compound of a metal of Group II-A, II-B, or III-A of the Periodic Table. The Periodic Table referred to is the same Periodic Table referred to in U.S. Pat. No. 3,219,648. The preferred examples of such catalysts are the reaction products of a titanium chloride and an aluminum alkyl. Desirably, such Ziegler-type catalysts may be deposited on an inert support to provide a large ratio of catalyst surface to catalyst weight. The Ziegler-type catalysts may be prepared in situ in the liquid hydrocarbon subsequently incorporated into the Bingham fluid. A detailed description of the above types of polymerization initiators are set forth in the text Crystalline Olefin Polymers—Part I by R. A. V. Raff and K. W. Doak, Interscience Publishers, 1965, Library of Congress Catalog No. 64–12191; which description is incorporated heren by reference.

A second desirable class of functional materials which can be dispersed in the Bingham fluid compositions of the invention are free radical generating polymerization initiators. These initiators can be of any chemical type that decomposes to generate free radicals at an appropriate rate at the polymerization temperatures employed in the mass polymerization of ethylene. Typically, these initiators decompose at a rate such that one-half of the initiator decomposes in 10 hours at a temperature in the range of about 50°–130° C. Appropriate initiators of this type are widely reported in the literature. The maximum benefits of the invention are obtained when the polymerization initiators have limited solubility in liquid aliphatic hydrocarbons. Examples of suitable polymerization initiators includes peroxides such as decanoyl peroxide, and azo initiators such as 2,2'-azo-bis-isoburyronitrile and azo-bis-isobutyramidine. Most free radical generating polymerization initiators, in their purified state, are solids. By reason of their potentially explosive nature, however, many of these compounds are supplied as solutions (principally in hydrocarbon solvents). These solutions can be incorporated directly into the Bingham fluid compositions without further purification.

A third desirable class of functional materials to be included in the Bingham fluid compositions of the invention are those which, when injected into a polymerization reaction system, function either to control a polymerization reaction, or to modify the properties of the polymer product being produced. An example of such a class of materials includes telogenating agents such as propane, nitrobenzene, nitrosobenzene, stilbene quinones, picrylhydrazyl, and the like. Another example of such a class of materials includes comonomers and other materials which will modify the polymer being produced, e.g., cyclopentene, acenaphthene, certain low molecular weight diene rubbers such as poly-1,2-butadiene, long chain alphaolefins, etc. Yet another example of such a class of materials includes the organo silicones and flurosilicones such as dimethylsilicone, diphenylsilicone, and the like. These materials sometimes are injected into a particle form polymerization reaction zone to modify the size and/or shape of the polymer particles being produced.

A fourth desirable class of functional materials which are usefully dispersed in the Bingham fluid compositions of the invention are of the type incorporated into polymers, particularly ethylene and propylene polymers, to modify certain properties thereof. One example of such materials includes materials such as carbon black, titanium dioxide, and other pigments and dyes which are employed to color polymers. A second example of such materials includes various materials such as hindered phenols, organophosphites, and the like which are incorporated into polymers to function as antioxidants, stabilizers, and the like. A third example of such materials includes so-called slip agents such as the long chain fatty acid amides, particularly oleamide and erucamide. A fourth example of such materials includes antistat agents such as glyceryl monostearate, and the like. Another example of such additives includes $C_{20}$ to $C_{40}$ hydrocarbons which sometimes are included in ethylene polymers as cling additives.

It will be recognized that certain functional agents may serve two or more functions when incorporated into certain polymer systems of interest. By way of examples, carbon black can be employed in ethylene polymers as a colorant. It also serves as a light stabilizer or sun-screen. Titanium dioxide serves a similar dual function when incorporated into propylene polymers.

In selected special cases, the liquid hydrocarbon included in the continuous solid phase of the Bingham fluid composition also can function as a functional additive. Thus a Bingham fluid composition containing propane as the liquid hydrocarbon can be used to inject propane into a high pressure ethylene polymerization system to function as a telogenating agent. In this composition, the propane serves the dual function as the liquid hydrocarbon component of the continuous solid phase and as a functional telogenating agent. Similarly, a Bingham fluid composition containing a liquid mono-1-olefin such as hexene as the liquid hydrocarbon can be used to inject hexene into a stereospecific ethylene polymerization system. The hexene serves the dual function as the liquid hydrocarbon component of the continuous phase and as a functional comonomer.

The percentage of the functional material to be dispersed in the Bingham fluid compositions of the invention can be varied over a wide range and normally will be set to facilitate the incorporation of the appropriate quantity of the functional material into the polymerization zone or the molten polymer by pumping the Bingham fluid composition therein. Customarily, the functional material will be dispersed in the Bingham fluid compositions of the invention in the range of about 1–60 weight %, preferably about 1–40 weight %, and especially about 5–20 weight % of the total composition. It is apparent that the invention provides great flexibility in metering either high or low concentrations of a desired functional material into a system of interest, with the further advantage that the addition can be made at a uniform rate.

The compositions of the invention are particularly useful in introducing into mono-1-olefin polymerization systems of interest functional materials which are used at low concentrations and especially where the functional material has a low solubility in desirable solvents such as liquid hydrocarbons. This results from the fact that FDA requirements severely limit the types of solvents that can be added to mono-1-olefin polymers that subsequently will be used in contact with food stuffs. It also is noted that alternative solvents frequently contain functional groups which adversely affect the polymerization reaction or polymer properties.

A desirable characteristic of the Bingham fluid compositions of the invention is that they readily dissolve and/or disperse when they contact a liquid hydrocarbon. Thus, when a Bingham fluid composition containing a Ziegler-type catalyst is pumped into a reactor in which an olefin such as ethylene is being polymerized in a liquid hydrocarbon medium, the continuous solid phase is dispersed in a very short period of time and the suspended catalyst solids are dispersed in the liquid medium to aid in the polymerization of the olefin.

Another desirable characteristic of the Bingham fluid compositions of the invention is that all components which make up the continuous solid phase are essentially inert and have no adverse effect on the polymer systems to which they are added. When the Bingham fluid compositions are added to an olefin polymerization being carried out in a hydrocarbon medium, the liquid hydrocarbon component of the Bingham fluid is removed from the polymer product with the hydrocarbon medium in which the polymerization is carried out. The olefin polymer component of the continuous solid phase will be incorporated into the recovered polymer product. This will cause no difficulty because it will be present in a very small amount. Moreover, the olefin polymer included in the Bingham fluid composition will be selected to closely match the composition and properties of the olefin polymer being produced in the polymerization reaction. The siliceous component is present in such small amounts as to be undetectable in the ultimate product. In a like manner, when the Bingham fluid compositions are employed to incorporate functional additives into a molten olefin polymer, the continuous solid phase has no adverse effect on the properties of the olefin polymer.

The physical state of the Bingham fluid compositions will be determined by the nature of the functional material included therein. When the functional material is a solid not soluble in the continuous solid phase, the final composition will consist of a uniform dispersion of the solid functional material in the continuous solid phase. When the functional material is soluble in the continuous solid phase, the final composition will be a homogeneous solid having the functional material dissolved therein.

The Bingham fluid compositions employed in the invention are prepared by stirring the liquid hydrocarbon, the finely-divided olefin polymer, the siliceous material, and the functional additive in a suitable vessel. This mixture is agitated with sufficient intensity to disperse all of the components uniformly throughout the liquid hydrocarbon. When the stirring is terminated, the mixture solidifies. The solidified mixture then is transferred to a suitable storage vessel.

The apparatus illustrated in FIG. 1 contains a reactor 10 provided with a stirrer 12 driven by motor 14. The reactor 10 is constructed so that it can operate under an applied pressure of at least about 100 psig. Lines 16, 18, and 20 are provided to feed to the reactor, respectively, a liquid hydrocarbon, the finely-divided olefin polymer, the siliceous material, and the functional material which is to be dispersed in the final Bingham fluid composition. A gas line 22 fitted with a two-way valve 24 is provided so that the reactor 10 can be pressurized to discharge the Bingham fluid composition from reactor 10 via outlet line 21, which contains a valve 19. Line 21 is connected to storage vessel 30. A two-way valve 28 is provided in line 21 so that the Bingham fluid composition from reactor 10 also can be fed through line 34 to a second storage vessel 36 which is maintained in parallel with storage vessel 30. A transfer line 32 equipped with a valve 33 is provided in storage tank 30 so that the Bingham fluid composition contained therein can be transferred therefrom by means of gear pump 42. In a like manner, an outlet line 38 equipped with a valve 40 is provided in storage tank 36 for feeding the Bingham fluid composition through line 32 to gear pump 42.

In the preparation of the Bingham fluid composition, a liquid hydrocarbon is introduced into reactor 10 through line 16, and the finely-divided olefin polymer and the siliceous material are fed to reactor 10 through line 18. The functional additive to be included in the Bingham fluid composition is fed to reactor 10 via line 20. The mixture is stirred to provide a homogeneous dispersion of all components in the liquid hydrocarbon. The lines 16, 18, and 20 then are sealed by suitable valves not shown and the reactor is pressurized by an inert gas introduced into the reactor via line 22. Valves 19 and 28 are opened and the Bingham fluid composition in reactor 10 is transferred via line 21 to storage tank 30.

To assure that an adequate supply of the Bingham fluid composition is available at all times, the operations above-described are repeated with the exception that valve 28 is turned so that the Bingham fluid composition prepared in reactor 10 is transferred to the second storage tank 36.

With the storage tanks 30 and 36 filled with the desired Bingham fluid composition, the apparatus is in a condition to feed the Bingham composition to a polymerization vessel or to a polymer melt in a compounding extruder or like apparatus. Valve 19 is closed and valves 24 and 28 are set so that gas from line 22 is fed through line 26 into line 21 so as to apply a pressure on the contents of storage tank 30. The pressure applied on storage tank 30 converts the Bingham fluid composition to the liquid phase and forces the composition through line 32 and valve 33 to gear pump 42 which feeds the composition to either a reactor connected thereto, or to an inlet line of a compounding extruder. After storage tank 30 has been emptied, valve 28 is turned so that the gas pressure introduced through line 22 is fed through line 34 to pressurize storage tank 36 which feeds its contents to gear pump 42. After storage tank 30 is emptied and storage tank 36 is being emptied, additional Bingham fluid composition is prepared in reactor 10 and is transferred to refill storage tank 30.

To prepare Bingham fluid compositions containing a normally gaseous hydrocarbon such as ethylene as the liquid hydrocarbon component of the Bingham fluid compositions, it is necessary to operate at reduced temperature and elevated pressures. The reactor 10, if necessary, is modified to operate at a pressure well in excess of 50 atmospheres. The reactor 10 is sealed and charged with the finely-divided olefin polymer, the siliceous material, and the functional additive. Ethylene then is admitted to reactor 10 at a pressure well in excess of 50.5 atmospheres. Reactor 10 is cooled to a temperature well below 9.9° C. to liquify the ethylene. Stirring is then provided to disperse previously charged materials throughout the liquid ethylene. Valves 19 and 28 are opened to transfer the Bingham fluid composition to storage vessel 30 which will be maintained well below 9.9° C. Valve 19 is closed and valves 24 and 28 are adjusted so that storage vessel 30 is maintained under an ethylene pressure in excess of 50.5 atmospheres. When valve 33 is opened, the Bingham fluid composition will flow through line 32 to gear pump 42. Line 32, valve 33, gear pump 42, and line 44 will be maintained at a temperature below 9.9° C.

Bingham fluid compositions of the invention containing a solid polymerization catalyst can be employed to feed a polymerization catalyst to an olefin polymerization process carried out in the presence of a liquid hydrocarbon. Apparatus and procedural steps that can be employed are disclosed in the copending application of Thomas J. Lynch and Robert J. Rowatt, Ser. No. 907,446, filed on May 19, 1978, which descriptions are incorporated herein by reference.

Bingham fluid compositions of the invention containing a solid polymerization catalyst can be employed to feed a polymerization catalyst to an olefin polymerization process carried out in the vapor phase. Apparatus and procedural steps that can be employed are disclosed in the copending application of Ronald E. Gilbert, Thomas J. Lynch, and Robert J. Rowatt, Ser. No. 907,444, filed on May 19, 1978, which descriptions are incorporated herein by reference.

Bingham fluid compositions of the invention containing a free radical generating polymerization initiator can be employed to feed the polymerization initiator to a continuous high pressure mass process for the polymerization of ethylene. Apparatus and procedural steps that can be employed are disclosed in the copending application of Ronald E. Gilbert, Thomas J. Lynch, and Robert J. Rowatt, Ser. No. 907,517, filed on May 19, 1978, which descriptions are incorporated herein by reference.

Bingham fluid compositions of the invention containing a functional additive can be employed to disperse such additive in a thermoplastic polymer. Apparatus and procedural steps that can be employed are disclosed in the copending application of Ronald E. Gilbert, Thomas J. Lynch, and Robert J. Rowatt, Ser. No. 907,531 filed on May 19, 1978, which descriptions are incorporated herein by reference.

The following examples are set forth to illustrate more clearly the principle and practice of this invention to those skilled in the art. When parts and percentages are mentioned, they are parts and percentages by weight unless otherwise specifically noted.

EXAMPLE 1

Part A

Reactor 10 which had a 3-liter capacity was charged with 740 ml of a 20 weight % solution of triethyl aluminum in n-heptane. The contents of the reactor were heated to about 55° C. and 109 gms of particulate aluminum-reduced titanium trichloride was charged to the reactor. The reaction product was a highly active Ziegler-type polymerization catalyst. A finely-divided ethylene homopolymer having a bulk density of about 10 lbs/ft$^3$ and a melt index of about 0.5, in the amount of 500 grams was slowly added to the reactor with good stirring to thoroughly disperse the polymerization catalyst particles and the ethylene polymer particles throughout the heptane. The reactor then was charged with 10 parts by weight of a finely-divided siliceous material sold by the Cabot Corporation under its trade designation Cab-O-Sil* PTG. This product is reportedly prepared by burning an organosilicon compound, has many hydroxyl groups attached to silicon atoms, and has an oxygen/silicon atomic ratio of greater than about 2.6/1.0. The mixture in reactor 10 can be stirred to readily disperse the suspended solids, but when stirring is terminated, the mixture sets up in a gel-like structure from which the suspended solid particles do not settle. Valves 19 and 28 were opened and a nitrogen pressure of 50 psig was introduced into reactor 10 by line 22 to transfer the contents of reactor 10 to storage tank 30.

*Trademark of the Cabot Corporation.

Part B

The Bingham fluid composition of Part A was employed as a catalyst to prepare polyethylene in a stirred particle form reactor. The polymerization reactor was run continuously with heptane being charged to the reactor at a rate of 320 lbs/hr. and ethylene being charged to the reactor at a rate of 30 lbs/hr. The polymerization was carried out at a temperature of about 90° C. and at a pressure of about 450 psig. The Bingham fluid composition of Part A was continuously introduced into the reactor via gear pump 42 at a rate of approximately 30 ml/hr. to feed the reactor the equivalent of about 1.4 gm. of the active catalyst per hour. Over a three-hour period, approximately 80 lbs. of polyethylene was produced, with polymer being produced at a rate of about 8950 lbs. of polyethylene/lb. of catalyst.

EXAMPLE 2

Part A

A charge of approximately 500 ml of n-heptane was made to reactor 10. There then was fed to the reactor 50 parts by weight of decanoyl peroxide slurried in 200 parts by weight of n-heptane. The mixture was stirred continuously and 500 parts of powdered low density homopolymer (passing through a 100 mesh screen (U.S. Standard)—resin melt index being 2) was added in small increments over a period of about 10 minutes. A charge of 15 parts of the Cabosil described in Example 1 then was made while continuing the stirring. The Bingham fluid composition then was transferred to storage tank 30 as previously described in Example 1, Part A.

Part B

The composition of Part A was used to polymerize ethylene in a one-zone stirred autoclave having a 12-inch internal diameter. The reactor was operated at a pressure of about 18,000 psig with the temperature varying from 325° F. to 500° F. in different sections of the reactor. The composition of Part A was introduced at a steady rate to provide the equivalent of one pound of catalyst for each one thousand pounds of polymer being produced. Polymer was produced at a rate of about 2,000 lbs/hr. The polyethylene produced had a melt index of about 2.0 and a density of about 0.923.

EXAMPLE 3

Another Bingham fluid composition can be prepared in the same manner as described in Example 2, Part A, except that the decanoyl peroxide will be replaced with an equal weight of a bis (cyclopentadienyl) chromium (II) supported upon a silica support. This chromium catalyst can be prepared as described in U.S. Pat. No. 3,709,853. This Bingham fluid composition can be employed to feed the catalyst to a fluidized vapor phase ethylene polymerization system of the type described in U.S. Pat. No. 3,790,036.

EXAMPLE 4

A Bingham fluid composition suitable for use in injecting a total additive package into a film grade low density ethylene polymer was prepared from 750 ml of hexane, 500 grams of the powdered ethylene homopolymer described in Example 2, Part A, 190 grams of diatomaceous earth, 450 grams of erucamide, and 380 grams of an antioxidant. This Bingham fluid composition can be injected into the melt zone of a compounding extruder to prepare a film grade resin.

What is claimed is:

1. A polymerization-initiating, polymerization-controlling or polymerization-modifying Bingham fluid composition suitable for continuous direct addition to a continuous olefin polymerization reaction system, said composition being a solid at ambient temperature and capable of flow under an applied pressure, said composition consisting essentially of:
   (a) a continuous solid phase consisting essentially of an intimate mixture of:
      (i) 100 parts by weight of a liquid hydrocarbon,
      (ii) 2 to 250 parts by weight of a finely-divided olefin polymer, and
      (iii) a minor amount of at least 0.2 part by weight of a finely-divided siliceous material having at least one dimension smaller than about 0.01 micron, said siliceous material having a number of hydroxyl groups attached to silicon atoms and having an oxygen/silicon ratio of at least about 2.1/1.0, and
   (b) at least one functional material uniformly dispersed throughout the continuous solid phase of (a); said functional material being a polymerization initiator or a telogenating agent.

2. A composition of claim 1 in which the continuous solid phase of (a) consists essentially of 100 parts by weight of the liquid hydrocarbon, about 10 to 200 parts by weight of the finely-divided olefin polymer, and about 0.5 to 5 parts by weight of the finely-divided siliceous material.

3. A composition of claim 1 or 2 in which the siliceous material is prepared by burning an organosilicon compound.

4. A composition of claim 1 or 2 in which the siliceous material is diatomaceous earth.

5. A composition of claim 1 or 2 in which the functional material of (b) dispersed throughout the continuous solid phase of (a) is a solid at ambient temperature.

6. A composition of claim 1 or 2 in which the functional material of (b) dispersed throughout the continuous solid phase of (a) is a catalyst for the polymerization of a polymerizable olefin.

7. A composition of claim 1 or 2 in which the functional material of (b) dispersed throughout the continuous solid phase of (a) is a chromium compound.

8. A composition of claim 1 or 2 in which the functional material of (b) dispersed throughout the continuous solid phase of (a) is the reaction product of a salt of a transition metal of Group IV-B, V-B, or VI-B of the Periodic Table and an organometallic compound of a metal of Group II-A, II-B, or III-A of the Periodic Table.

9. A composition of claim 1 or 2 in which the functional material of (b) dispersed throughout the continuous solid phase of (a) is the reaction product of a titanium chloride and an aluminum alkyl.

10. A composition of claim 1 or 2 in which the functional material of (b) dispersed throughout the continuous solid phase of (a) is a free radical generating polymerization initiator.

11. A polymer-modifying Bingham fluid composition suitable for continuous direct addition to a molten polymer stream, said composition being a solid at ambient temperature and capable of flow under an applied pressure, said composition consisting essentially of:
   (a) a continuous solid phase consisting essentially of an intimate mixture of:
      (i) 100 parts by weight of a liquid hydrocarbon,
      (ii) 2 to 250 parts by weight of a finely-divided olefin polymer, and
      (iii) a minor amount of at least 0.2 part by weight of a finely-divided siliceous material having at least one dimension smaller than about 0.01 micron, said siliceous material having a number of hydroxyl groups attached to silicon atoms and having an oxygen/silicon ratio of at least about 2.1/1.0, and
   (b) at least one functional material uniformly dispersed throughout the continuous solid phase of (a); said functional material being an antioxidant, a slip agent or an antistat agent.

12. A composition of claim 11 in which the continuous solid phase of (a) consists essentially of 100 parts by weight of the liquid hydrocarbon, about 10 to 200 parts by weight of the finely-divided olefin polymer, and about 0.5 to 5 parts by weight of the finely-divided siliceous material.

13. A composition of claim 11 or 12 in which the siliceous material is prepared by burning an organosilicon compound.

14. A composition of claim 11 or 12 in which the siliceous material is diatomaceous earth.

15. A composition of claim 11 in which the functional material of (b) dispersed throughout the continuous solid phase of (a) is a solid at ambient temperature.

16. A composition of claim 11 in which at least one of the functional materials is an antioxidant.

17. A composition of claim 11 in which at least one of the functional materials is a slip agent.

18. An ethylene polymerization initiating Bingham fluid composition which is a solid at subambient temperatures but which will flow under an applied pressure consisting essentially of:
   (a) a continuous solid phase consisting essentially of an intimate mixture of:
      (i) 100 parts by weight of ethylene,
      (ii) 2 to 250 parts by weight of a finely-divided olefin polymer, and
      (iii) a minor amount of at least 0.2 part by weight of a finely-divided siliceous material having at least one dimension smaller than about 0.01 micron, said siliceous material having a number of hydroxyl groups attached to silicon atoms and having an oxygen/silicon ratio of at least about 2.1/1.0, and
   (b) an ethylene polymerization initiator uniformly dispersed throughout the continuous phase.

19. In a continuous high pressure process for the mass polymerization of ethylene in which ethylene and a free radical generating polymerization initiator are fed continuously to a polymerization zone operating at an elevated temperature and at a pressure of at least about 1,000 atmospheres; the improvement which consists essentially of feeding the polymerization initiator to the polymerization zone on a continuous basis by pumping a Bingham fluid composition of claim 1 into the polymerization zone.

20. In a continuous process for the polymerization of a polymerizable olefin in a liquid hydrocarbon medium in which olefin monomer is continuously added to the polymerization zone, finely-divided solid polymerization catalyst is added to the polymerization zone, and the polymerization product is continuously withdrawn from the reaction zone; the improvement which consists essentially of feeding the polymerization catalyst to the reaction zone on a continuous basis by pumping a Bingham fluid composition of claim 1 into the reaction zone.

21. In a process for the catalytic polymerization of a polymerizable olefin in the vapor phase in the presence of solid polymerization catalyst particles in a moving bed of particles of the polymerized olefin; the improvement which consists essentially of feeding the solid polymerization catalyst particles to the polymerization zone by pumping a Bingham fluid of claim 1 into the polymerization zone.

* * * * *